Oct. 3, 1967 M. H. ESTKOWSKI 3,345,074

RECORD CHANGER SPINDLE

Filed Sept. 3, 1965 2 Sheets-Sheet 1

INVENTOR
MICHAEL H. ESTKOWSKI
BY
Brown, Jackson,
Boettcher & Dienner
ATTYS.

Oct. 3, 1967 M. H. ESTKOWSKI 3,345,074

RECORD CHANGER SPINDLE

Filed Sept. 3, 1965 2 Sheets-Sheet 2

INVENTOR
MICHAEL H. ESTKOWSKI
BY
Brown, Jackson,
Boettcher & Dienner
ATTYS.

3,345,074
Patented Oct. 3, 1967

3,345,074

RECORD CHANGER SPINDLE

Michael H. Estkowski, St. Joseph, Mich., assignor to V-M Corporation, Benton Harbor, Mich., a corporation of Michigan Filed Sept. 3, 1965, Ser. No. 484,895
10 Claims. (Cl. 274—10)

The present invention relates to a spindle for a record changer. More specifically, the invention relates to a record changer spindle of the type which rotates conjointly with a turntable, and in particular to record holding mechanism associated with the spindle for engaging a record in playing position on the turntable to assure that the record rotates conjointly with the turntable for optimum reproduction of the recording.

In a conventional record changer a plurality of records are supported on the upper end of a center spindle and such records are released one at a time to a turntable for playing. In most such record changers the spindle is vertically disposed and is non-rotatable, while the turntable rotates in a horizontal plane about the vertical spindle axis. The diameter of the spindle is slightly smaller than the centerhole diameter of the records and serves to maintain any records on the turntable in a centered position as the records rotate with the turntable about the spindle. With conventional record changers of the foregoing type, it will be understood that a single record disposed in playing position on the turntable is rotated solely due to its frictional engagement with the rotating turntable. Consequently, when a plurality of records are stacked on the turntable and the uppermost record is being reproduced, the latter record is rotated solely due to the frictional engagement between the several records stacked on the rotating turntable.

Where a plurality of records are stacked on a turntable, there is some tendency for the records to slip relative to one another, and of course when slippage occurs the uppermost record being reproduced is not rotated at the proper speed, i.e., the speed of the turntable. Moreover, various record changers are being developed where the spindle is tilted substantially away from the vertical, while remaining perpendicular to the turntable which is thus tilted a corresponding amount out of a horizontal plane. For example, the turntable may be disposed in a plane which is inclined approximately 13 degrees from the vertical, in which case the spindle being perpendicular to the turntable is disposed at an angle of only 13 degrees from the horizontal. It will be understood that with a tilted record changer of the latter type, a stack of records on the turntable will have considerably less than the usual tendency to rotate with the turntable, because the force of gravity on the record will no longer be primarily in the direction of the turntable. Accordingly, it is particularly advantageous in conjunction with a tilted record changer to provide mechanism for assuring that records disposed on the turntable will rotate conjointly with the turntable.

It is known to provide a record changer spindle which rotates with the turntable, and to provide mechanism associated with such a spindle for engaging the centerhole edge of records on the turntable in order to cause the records to rotate with the spindle and consequently with the turntable. However, a record gripping mechanism of the type heretofore known comprises a member which is disposed within the spindle body when retracted and is moved generally radially outwardly of one side of the spindle body to engage the centerhole edges of the records on the turntable and pull such records laterally against the opposite side of the spindle body. In other words, gripping of the records is accomplished by in effect temporarily enlarging the diameter of the spindle body so that it engages firmly against the centerhole edges of the records. I have found that the records on a turntable can be caused to rotate conjointly with the turntable with much greater reliability and with less wear on the record centerholes by applying a force to the uppermost record in the approximate direction of the turntable. When utilized in conjunction with a tilted record changer, such added force replaces the gravity force which is greatly reduced due to the orientation of the changer.

It is therefore an object of the present invention to provide a rotatable record changer spindle having improved mechanism for engaging and holding a record in playing position on the turntable in order to cause the record to rotate conjointly with the turntable.

A more specific object of the invention is to provide a record changer spindle as last above-mentioned having a record holding member which when operatively positioned engages against the uppermost one of a stack of records on the turntable and urges such record generally in the direction of the turntable so as to press the records on the turntable against one another and cause them to rotate conjointly with the turntable.

The foregoing and other objects and drawings of the invention will be apparent from the following description thereof.

Now in order to acquaint those skilled in the art with the manner of utilizing and practicing my invention, I shall describe, in conjunction with the accompanying drawings, certain preferred embodiments of the invention.

Figures 5, 6, 7, 8:
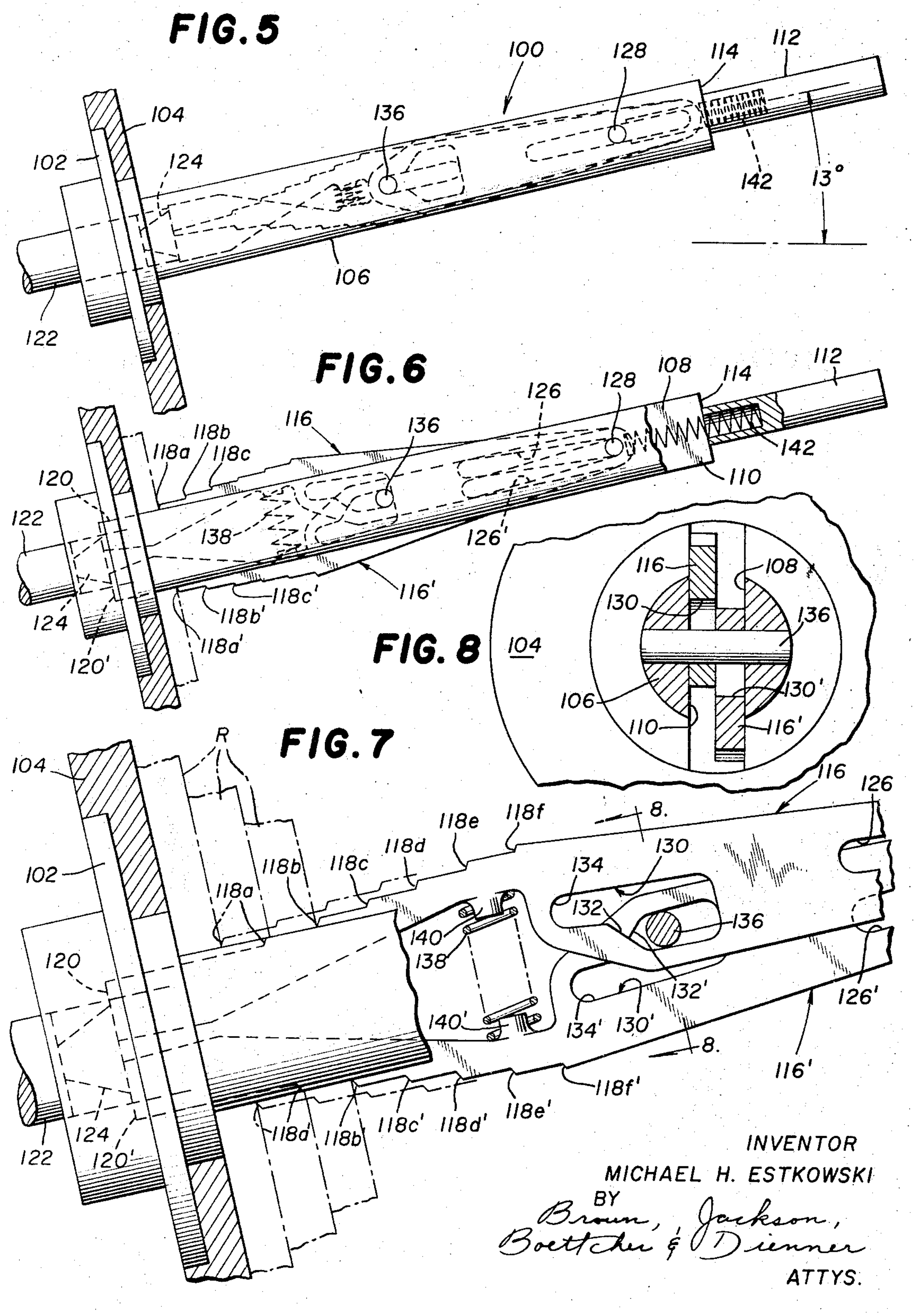
FIGURE 5 is an elevational view, partly broken away and partly in section, showing an alternative embodiment of the invention comprising a record changer spindle having a pair of record holding members which project from opposite sides of the spindle body to engage the uppermost one of a plurality of records on the turntable.
FIGURE 6 is a view similar to FIGURE 1 showing the pair of record holding members operatively positioned to engage a record in playing position and urge the same against the turntable.

FIGURE 7 is an enlarged fragmentary elevational view, partly in section, showing the lower end of the spindle of FIGURE 6, the pair of record holding members being shown in solid lines in the operative record holding positions they assume when three records are disposed on the turntable and in dash lines in the operative record holding positions they assume when a single record is disposed on the turntable; and FIGURE 8 is a transverse sectional view taken substantially along the line 8—8 of FIGURE 7.

Before describing the present invention in detail, it should be understood that the record holding mechanism of the invention may be used to advantage in conjunction with substantially any record changer spindle of the type which rotates with the turntable, and thus its use is not limited to a tilted record changer. On the other hand, the record holding mechanism of the invention will be described hereinafter in conjunction with a record changer spindle which is inclined at an angle of only approximately 13 degrees from the horizontal, since such holding mechanism obviously has particular utility in an application of this type where the force of gravity on the records has only a minor effect in urging a record in playing position toward the turntable.

Referring now to the drawings, FIGURES 1–4 illustrate a record changer spindle 20 which is fixedly connected with a turntable 22 for conjoint rotation therewith. The spindle 20 has an enlarged diameter hub portion 24 at its lower end which fits up into a central aperture 26 in the turntable 22, and a flange 28 on the spindle is bolted or otherwise fastened to the turntable to secure the spindle thereto. In the embodiment being described, the spindle 20 extends perpendicular to the turntable 22 at an angle of 13 degrees from the horizontal, and the spindle comprises a spindle body 30 having a reduced diameter extension 31 at the upper end thereof which is covered with a sleeve 32. The lower end of the spindle extension 32 forms an annular shoulder 34, and the extension comprises a record storage member for holding a plurality of records to be played. That is, a stack of records to be played may be mounted over the extension 32 so as to rest against the annular shoulder 34, and a stabilizing member (not shown) may be provided which bears downwardly on the uppermost record in the stack so as to urge the records against the shoulder 34 and also stabilize the records. It should be noted that terms such as "upper," "lower," "upwardly" and "downwardly" and words of like import will be used herein and in the appended claims as if the spindle were vertically disposed, and thus "upwardly" will mean away from the turntable and "downwardly" will mean toward the turntable.

Figures 1, 2, 3, 4:
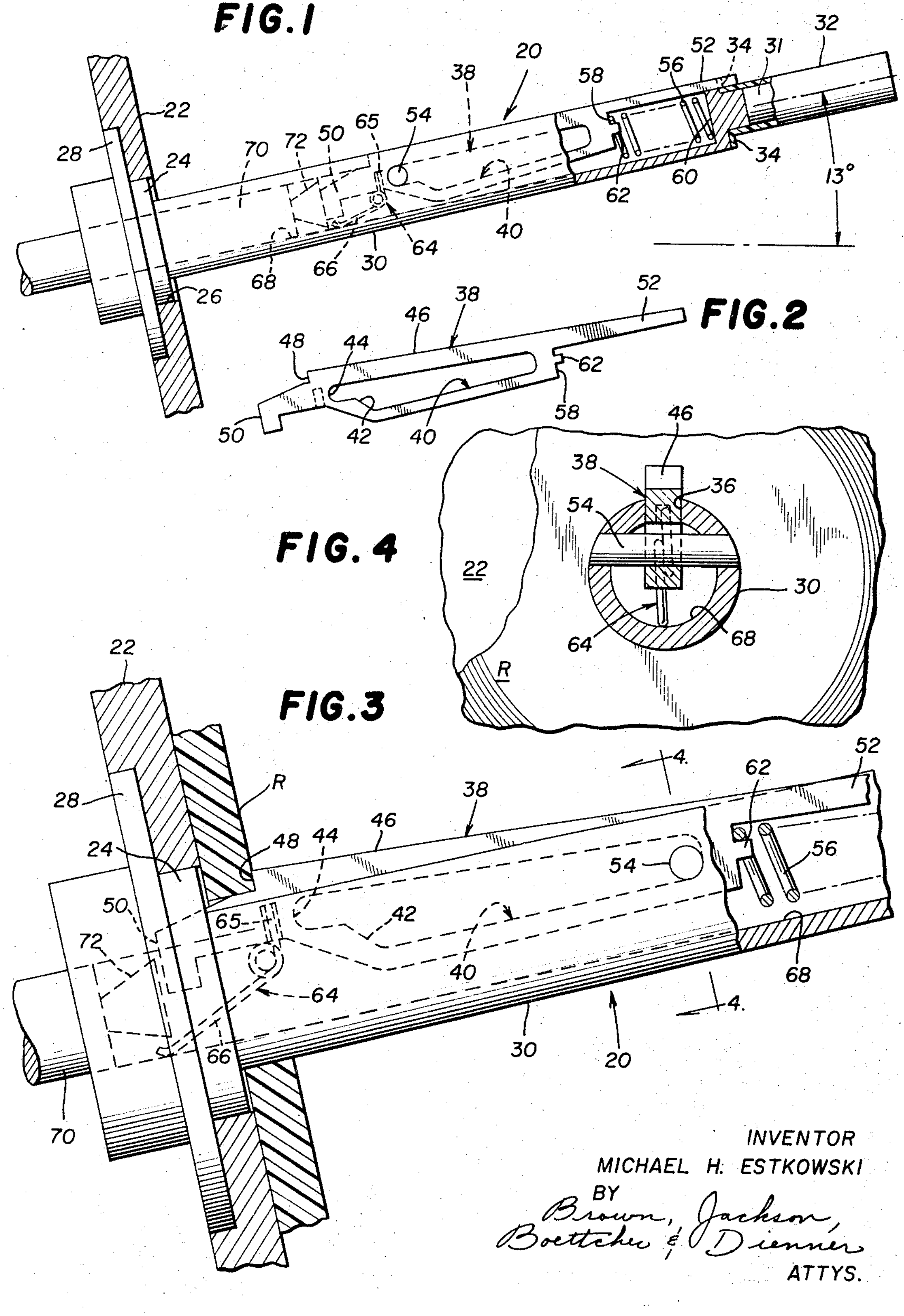
FIGURE 1 is an elevational view, partly broken away and partly in section, showing a tilted record changer spindle having record holding means constructed in accordance with the present invention.
FIGURE 2 is a detail elevational view of a record holding member which comprises one component of the record changer spindle of FIGURE 1.
FIGURE 3 is an enlarged fragmentary elevational view, partly broken away and partly in section, showing the lower end of the spindle of FIGURE 1 and illustrating the record holding member in operative position to act upon a record in playing position and urge the same against the turntable.
FIGURE 4 is a fragmentary transverse sectional view taken substantially along the line 4—4 of FIGURE 3.

The spindle body 30 comprises a generally hollow cylindrical member having a longitudinal slot 36 which extends the full length thereof. A record holding member 38 is positioned within the spindle body 30 in the slot 36, and the holding member is movable between a retracted position as shown in FIGURE 1 and an extended position such as shown in FIGURE 3. The record holding member 38 is substantially flat and has a generally longitudinal slot 40 formed therein. The lower end of the slot 40 includes an inclined cam surface 42, and an extreme lower end portion 44 of reduced width. One side of the holding member 38 comprises a flat surface 46 which at its lower end terminates at a record engaging step 48, and the lower end of the holding member comprises a leg 50 which cooperates with an actuator in a manner to be described hereinafter. The upper end of the record holding member 38 includes a relatively long leg 52 which functions during a record change cycle to lift the lowermost one of the records on the storage extension 32 over the shoulder 34 so as to permit the record to fall downwardly along the spindle body to the turntable for playing.

The record holding member 38 is disposed inside the spindle body 30 within the longitudinal slot 36, and a cross pin 54 is fixedly mounted on the spindle body so as to project through the slot 40 and thereby guide the holding member. A compression spring 56 is positioned within the spindle body 30 between a ledge 58 on the holding member 38 and an upper end wall 60 of the spindle body. A tab 62 projects upwardly from the ledge 58 and is encompassed by the lower end of the compression spring 56. In this manner, the spring 56 urges the holding member 58 downwardly toward the turntable 22, and in addition the tab 62 cooperates with the lower end of the spring to laterally retain the upper end of the holding member and prevent it from falling out of the spindle. A second spring 64 has one arm 65 fixedly mounted in the side of the holding member 38 proximate the lower end thereof, and a second spring arm 66 engages against the inner wall 68 of the spindle so as to urge the lower end of the holding member radially outwardly of the spindle body 30. An actuator 70 is positioned within the lower end of the spindle body 30 and is axially movable upwardly and downwardly therein. The actuator has a pusher portion 72 on the upper end thereof which engages against the underside 50 of the holding member 38.

The operation of the record changer spindle shown in FIGURES 1–4 will now be described. The actuator 70 is shown in its normal at rest position in FIGURE 3 wherein it is disposed at the lower end of its axial stroke. A single record R is shown in playing position on the turntable 22, and the record is urged against the turntable by the record holding member 38. The lower end of the record holding member 38 is maintained in its radially extended position by the spring 64 so that it projects through the slot 36 and extends laterally outwardly of the spindle body 30 thereby exposing the record engaging step 48 which overlies the centerhole edge portion of the record R. Moreover, the compression spring 56 pushes downwardly on the holding member 38 so as to cause the step 48 to engage against the top of the record R adjacent its centerhole edge and urge the record against the turntable. The holding member 38 thus applies a force on the record in the direction of the turntable to assure that the record will rotate conjointly with the turntable during a playing cycle.

At the beginning of a record change cycle when it is desired to drop a further record to the turntable for playing, the actuator 70 is moved upwardly from the position of FIGURE 3 to the position of FIGURE 1, and the actuator due to its engagement with the underside 50 of the record holding member 38 will raise the latter to its uppermost position as shown in FIGURE 1. As the record holding member 38 approaches the latter position, the cross pin 54 will engage the inclined portion 42 of the slot 40 and will cam the holding member to a radially retracted position wherein it is entirely withdrawn into the spindle body 30.

In the embodiment being described, the upper end of the long leg 52 on the holding member 38 projects above the annular shoulder 34 when the holding member is in its uppermost position. Thus, the end of the leg 52 extends through the upper end of the longitudinal slot 36 and projects above the shoulder 34 by a distance which does not exceed the thickness of one record. The upward movement of the actuator 70 is timed so that the leg 52 will be caused to project above the shoulder 34 when the rotating spindle 20 is in a rotary position displaced 180 degrees from the position illustrated in FIGURE 1. Thus, the leg 52 will project beyond the shoulder 34 when the leg is disposed 180 degrees from the FIGURE 1 position, and the end of the leg will extend into the centerhole of the lowermost record supported on the extension 32. As the spindle 20 rotates 180 degrees, the end of the leg 52 will move to the position shown in FIGURE 1 and in so doing will lift the lowermost record on the extension 32 over the shoulder 34. In this manner, the lowermost record will be caused to slide down the spindle 20 to the turntable.

By the time the spindle has rotated a further 180 degrees, the actuator 70 must be moved downwardly an amount sufficient to retract the leg 52 beneath the shoulder 34 so that no additional records will be released down the spindle, and thus the leg 52 is caused to project above the shoulder 34 only for approximately one revolution of the spindle 20. The lowermost narrow slot portion 44 is of sufficient length to permit the holding member 38 to be moved toward the turntable enough to withdraw the leg 52 beneath the shoulder 34 without the pin 54 leaving the narrow slot portion. Consequently, the holding member 38 will dwell in such a position wherein it will remain radially retracted. The manner of storing the records on the upper end of the spindle on the extension 32 and releasing such records one at a time to the turntable for playing is more fully described in the copending application of Robert J. Hammond, Ser. No. 484,859, filed of even date herewith, and assigned to the assignee of the present invention. As previously stated, the present invention relates to the record holding mechanism, and the record releasing mechanism is described herein simply to illustrate by way of example a tilted record changer spindle with which the holding mechanism of the present invention may be used to advantage.

After allowing sufficient time for the released record to reach a playing position on the turntable, the actuator 70 is moved downwardly to the lower end of its stroke as shown in FIGURE 3. As the holding member 38 moves downwardly under the force of the spring 56, the narrow portion 44 of the slot 40 will move away from the cross pin 54, and the spring 64 will cause the holding member to move to its radially extended position wherein the record engaging step 48 will be exposed and will overlie the centerhole edge portion of the record on the turntable. It will thus be understood that the radially extended holding member 38 will continue to move toward the turntable under the force of the spring 56 until the step 48 engages and clamps against the record to be played. In this manner the holding member 38 applies a force to the top record on the turntable and urges the same in the direction of the turntable. In the embodiment being described the operative position of the record holding member 38 will depend upon the number of records on the turntable. Thus, the stroke of the member 38 will vary, since it is moved toward the turntable by the spring 56 until the step 48 comes into engagement with the record to be played. It will be seen that the actuator 70 is not connected to the holding member 38 and functions simply as a pusher to move the holding member upwardly within the spindle body 30, while the yieldable spring 56 moves the holding member in the opposite direction.

Reference is now made to FIGURES 5–8 which illustrate an alternative embodiment of the present invention. There is shown a record changer spindle 100 which is inclined so as to define an angle of approximately 13 degrees with the horizontal. The spindle 100 has a flange 102 at its lower end which is bolted or otherwise fixedly secured to a turntable 104 for rotation therewith. The spindle 100 comprises a cylindrical spindle body 106 having a pair of oppositely disposed longitudinal slots 108 and 110 formed therein (see FIGURE 8) which extend the full length of the spindle body. At the upper end of the spindle body 106 there is a reduced diameter extension 112, and, as in the embodiment of FIGURES 1–4, a plurality of records to be played may be hung on the extension 112 so as to rest against a shoulder 114. While no mechanism is shown for lifting one record at a time over the shoulder 114 for release to the turntable for playing, it will be understood that any suitable mechanism may be used for this purpose. If desired, such mechanism may take the form of the lifting finger 52 described in conjunction with the embodiment of FIGURES 1–4 and more fully described in the aforementioned copending application of Robert J. Hammond, Ser. No. 484,859.

A pair of record holding members 116 and 116' are positioned in side-by-side overlying relation in the spindle body 106. The holding member 116 has formed thereon a plurality of longitudinally spaced steps **118*a*, 118*b*, 118*c*, 118*d*, 118*e* and 118*f* formed on the outside thereof, while similar steps formed on the member 116' are indicated with corresponding primed reference numerals. The two holding members 116 and 116' are oppositely disposed in the sense that the member 116 is disposed in the slot 108 and is movable through the slot to an extended position where the several steps 118 project beyond one side of the spindle body 106 to overlie the centerhole edge portion of a record in playing position on the turntable 104, while the member 116' is disposed in the slot 110 and is movable through the latter slot to an extended position where the several steps 118'** project beyond the opposite side of the spindle body to overlie the opposite centerhole edge portion of a record on the turntable.

The record holding member 116 has a leg 120 at its lower end, and the holding member 116' has a similar leg 120'. An actuator 122 is axially slidable within the lower end of the spindle body 106 and has a pusher portion 124 at its upper end which engages against the undersides of both of the legs 120 and 120'. The upper end of the holding member 116 has a generally longitudinal slot 126 formed therein, and a similar slot 126' is formed in the holding member 116'. A cross pin 128 is fixedly secured to the spindle body 106 and extends through both of the slots 126 and 126' so as to guide and retain the upper ends of the holding members 116 and 116' as they move within the slots 108 and 110 respectively between upper retracted inoperative positions as shown in FIGURE 5 and lower radially extended operative positions as shown in FIGURES 6 and 7. Beneath the slots 126 and 126', the holding members are further provided with cam slots 130 and 130' having respective inclined cam portions 132 and 132' and narrow lower end slot portions 134 and 134'. A cross pin 136 is fixedly secured to the spindle body 106 and projects through both of the slots 130 and 130' in order to control the radial retraction of the two holding members 116 and 116' when they are moved upwardly by the actuator 122. Thus, when the holding members are moved upwardly, the pin 136 engages the two inclined cam slot portions 132 and 132' and retracts the holding members, and when the pin 136 is disposed in the two narrow slot portions 134 and 134' the two holding members will be fully withdrawn into the spindle body 106 as shown in FIGURE 5.

A compression spring 138 is disposed beneath the slots 130 and 130' and extends laterally between the two record holding members 116 and 116' to urge them in opposite radially extended directions, the ends of the spring being retained by tabs 140 and 140' formed on the holding members. Accordingly, when the holding members are moved downwardly causing the narrow slot portions 134 and 134' to move away from the pin 136, the compression spring 138 will cause both of the holding members to be radially extended as shown in FIGURES 6 and 7. A further compression spring 142 is positioned within the upper end of the spindle body 106 so as to act upon the upper ends of the holding members 116 and 116' and urge them downwardly toward the turntable. Thus, whenever the actuator 122 is moved downwardly, the spring 142 will cause downwardly movement of the two record holding members.

The operation of the foregoing record holding mechanism is much the same as that described in conjunction with FIGURES 1–4 except that two oppositely disposed holding members 116 and 116' are provided in the embodiment of FIGURES 5–8, and each of the latter holding members has a plurality of record engaging steps 118 and 118' so as to reduce the axial stroke required to engage a record on the turntable. Thus, at the beginnning of a record change cycle the actuator 122 is moved upwardly so as to raise the holding members 116 and 116' to their uppermost positions as shown in FIGURE 5, during which movement the pin 136 will cause the holding members to be fully withdrawn into the spindle body 106. While the holding members are retracted, mechanism (not shown) will lift the lowermost record on the storage extension 112 over the annular shoulder 114 and permit the record to slide down the spindle body to a playing position on the turntable.

After the record has reached the turntable 104, the actuator 122 is moved downwardly to its lowermost position of FIGURES 6 and 7, and the two holding members 116 and 116' are simultaneously moved downwardly toward the turntable by the compression spring 142. As the holding members move downwardly causing the narrow slot portions 134 and 134' to move away from the cross pin 136, the spring 138 moves the two holding members to their radially extended positions wherein the plurality of steps 118 project beyond one side of the spindle body 106 and overlie the centerhole edge portion of the uppermost record on the turntable, while the steps 118' project beyond the opposite side of the spindle body and overlie the opposite centerhole edge portion of the record. It will be understood that the holding members 116 and 116' will move downwardly toward the turntable 104 until one of the steps thereon engages the record to be played, whereby the holding members will act upon the top record to urge the same in the direction of the turntable.

As previously explained, the application of a force directed generally toward the turntable and applied to the top record on the turntable will assure that all of the records thereon will rotate conjointly with the turntable at the proper playing speed. It will further be understood that the stroke of the holding members 116 and 116' as they move from their uppermost positions of FIGURE 5 toward the turntable to engage a record will normally not exceed the longitudinal spacing of the several steps 118 and 118', since as soon as any one of the steps on each holding member engages the top record, the holding action will be effected. Thus, different ones of the record engaging steps will be operative to hold the top record, depending upon the number of records disposed on the turntable. FIGURE 7 shows the holding members 116 and 116' in solid lines with the steps **118*b* and 118*b'* engaged against the top record in a stack of three records R disposed on the turntable, and it further shows in dash lines the holding members with the steps 118*a* and 118*a'*** engaged in operative position against a single record disposed on the turntable.

While I have described my invention in certain preferred forms, I do not intend to be limited to such forms, except insofar as the appended claims are so limited, since modifications coming within the scope of my invention will readily occur to others with my disclosure before them.

I claim:

1. In a record changer spindle of the type which is fixedly secured to a turntable for rotation therewith, the improvement comprising, in combination, a spindle body, a longitudinal opening in the side of said spindle body, a record holding member having a record engaging surface thereon, said holding member being positioned within said spindle body and being movable axially and radially with respect to said spindle body in said longitudinal opening between an upper radially retracted position wherein said holding member is withdrawn into said spindle body and a lower radially extended position wherein said record engaging surface projects outwardly of said spindle body through said opening so as to overlie the centerhole edge portion of a record in playing position on said turntable, actuating means for moving said holding member upwardly away from said turntable when it is desired to release a record to the turntable for playing, means in response to the upward movement of said holding member for retracting said holding member into said spindle body, means for moving said holding member to its radially extended position and means for moving said holding member downwardly toward said turntable after the record to be played is positioned on said turntable, whereby said record engaging surface will engage against the top of said record adjacent the centerhole edge thereof and urge the same toward said turntable to provide for conjoint rotation of said record with said turntable.

2. In a record changer spindle of the type which is fixedly secured to a turntable for rotation therewith, the improvement comprising, in combination a spindle body, a longitudinal slot in the side of said spindle body, a record holding member having a record engaging step formed thereon, said holding member being positioned within said spindle body and being movable axially and radially with respect to said spindle body in said longitudinal slot between an upper radially retracted position wherein said holding member is withdrawn into said spindle body and a lower radially extended position wherein said record engaging step projects outwardly of said spindle body through said slot so as to overlie the centerhole edge portion of a record in playing position on said turntable, actuating means for moving said holding member upwardly away from said turntable when it is desired to release a record to the turntable for playing, means in response to the upward movement of said holding member for retracting said holding member into said spindle body, means for moving said holding member to its radially extended position and means for moving said holding member downwardly toward said turntable after the record to be played is positioned on said turntable, whereby said record engaging step will engage against the top of said record adjacent the centerhole edge thereof and urge the same toward said turntable to provide for conjoint rotation of said record with said turntable.

3. The invention of claim 2 wherein a plurality of longitudinally spaced record engaging steps are formed on said holding member so as to reduce the stroke required when said holding member is moved toward said turntable to engage a record in playing position on said turntable.

4. The invention of claim 2 wherein there are provided a pair of said holding members and a pair of longitudinal slots in opposite sides of said spindle body, said holding members being movable in opposite radial directions so that when in their radially extended positions they will project out opposite sides of said spindle body.

5. In a record changer spindle of the type which is fixedly secured to a turntable for rotation therewith, the improvement comprising, in combination, a spindle body, a longitudinal opening in the side of said spindle body, a record holding member having a record engaging step thereon, said holding member being positioned within said spindle body and being movable axially and radially with respect to said spindle body in said longitudinal opening between an upper radially retracted position wherein said holding member is withdrawn into said spindle body and a lower radially extended position wherein said record engaging step projects outwardly of said spindle body through said opening so as to overlie the centerhole edge portion of a record in playing position on said turntable, actuating means for moving said holding member upwardly away from said turntable when it is desired to release a record to the turntable for playing, means in response to the upward movement of said holding member for retracting said holding member into said spindle body, means for moving said holding member to its radially extended position and means for moving said holding member downwardly toward said turntable after the record to be played is positioned on said turntable, said means for moving said holding member downwardly including a spring for yieldably urging said holding member downwardly in said spindle body toward said turntable and said actuating means being operable against the force of said spring when it is desired to release a record to the turntable, whereby said record engaging step will engage against the top of said record adjacent the centerhole edge thereof and yieldingly urge the same toward said turntable to provide for conjoint rotation of said record with said turntable.

6. In a record changer spindle of the type which is fixedly secured to a turntable for rotation therewith, the improvement comprising, in combination, a spindle body, a longitudinal opening in the side of said spindle body, a record holding member having a record engaging step thereon, said holding member being positioned within said spindle body and being movable axially and radially with respect to said spindle body in said longitudinal opening between an upper radially retracted position wherein said holding member is withdrawn into said spindle body and a lower radially extended position wherein said record engaging step projects outwardly of said spindle body through said opening so as to overlie the centerhole edge portion of a record in playing position on said turntable, a cam slot formed in said record holding member, a cross pin which projects through said cam slot and acts upon said holding member so as to retract said holding member into said spindle body when said holding member is moved upwardly away from said turntable and to permit said holding member to assume its radially extended position when the latter is moved downwardly toward said turntable, means for moving said holding member to its radially extended position, actuating means for moving said holding member upwardly away from said turntable when it is desired to release a record to the turntable for playing and means for moving said holding member downwardly toward said turntable after the record to be played is positioned on said turntable, whereby said record engaging step will engage against the top of said record adjacent the centerhole edge thereof and urge the same toward said turntable to provide for conjoint rotation of said record with said turntable.

7. In a record changer spindle of the type which is fixedly secured to a turntable for rotation therewith, the improvement comprising, in combination, a spindle body, a longitudinal opening in the side of said spindle body, a record holding member having a record engaging step thereon, said holding member being positioned within said spindle body and being movable axially and radially with respect to said spindle body in said longitudinal opening between an upper radially retracted position wherein said holding member is withdrawn into said spindle body and a lower radially extended position wherein said record engaging step projects outwardly of said spindle body through said opening so as to overlie the centerhole edge portion of a record in playing position on said turntable, actuating means for moving said holding member upwardly away from said turntable when it is desired to release a record to the turntable for playing, means in response to the upward movement of said holding member for retracting said holding member into said spindle body, means for moving said holding member to its radially extended position and means for moving said holding member downwardly toward said turntable after the record to be played is positioned on said turntable, said means for moving said holding member to its radially extended position including a spring disposed within said spindle and engaged with said holding member for continuously urging said holding member toward its radially extended position, whereby said record engaging step will engage against the top of said record adjacent the centerhole edge thereof and urge the same toward said turntable to provide for conjoint rotation of said record with said turntable.

8. In a record changer spindle of the type which is fixedly secured to a turntable for rotation therewith, the improvement comprising, in combination, a spindle body, a longitudinal slot in the side of said spindle body, a record holding member having a record engaging step thereon, said holding member being positioned within said spindle body and being movable axially and radially with respect to said spindle body in said longitudinal slot between an upper radially retracted position wherein said holding member is withdrawn into said spindle body and a lower radially extended position wherein said record engaging step projects outwardly of said spindle body through said slot so as to overlie the centerhole edge portion of a record in playing position on said turntable, actuating means for moving said holding member upwardly away from said turntable when it is desired to release a record to the turntable for playing, means in response to the upward movement of said holding member for retracting said holding member into said spindle body, means for moving said holding member to its radially extended position and means for moving said holding member downwardly toward said turntable after the record to be played is positioned on said turntable, said means for moving said holding member downwardly including a first spring for yieldably urging said holding member downwardly in said spindle body toward said turntable, said actuating means being operable against the force of said first spring when it is desired to release a record to the turntable, and said means for moving said holding member to its radially extended position including a second spring disposed within said spindle and engaged with said holding member for continuously urging said holding member toward its radially extended position, whereby said record engaging step will engage against the top of said record adjacent the centerhole edge thereof and urge the same toward said turntable to provide for conjoint rotation of said record with said turntable.

9. The invention of claim 8 wherein a cam slot is formed in said record holding member, and said means for retracting said holding member into said spindle body includes a cross pin which projects through said cam slot and acts upon said holding member so as to retract said holding member into spindle body when said holding member is moved upwardly away from said turntable and which permits said holding member to assume its radially extended position when the latter is moved downwardly toward said turntable.

10. In a record changer spindle of the type which is fixedly secured to a turntable for rotation therewith, the improvement comprising, in combination, a spindle body, a pair of longitudinal slots formed in opposite sides of said spindle body, a pair of record holding members each having a plurality of longitudinally spaced record engaging steps formed thereon, said holding members being positioned within said spindle body and being movable axially and radially with respect to said spindle body in corresponding ones of said longitudinal slots between upper radially retracted positions wherein said holding members are withdrawn into said spindle body and lower radially extended positions wherein said record engaging steps project outwardly on opposite sides of said spindle body through corresponding ones of said slots so as to overlie opposite sides of the centerhole edge portion of a record in playing position on said turntable, actuating means for moving said holding members upwardly away from said turntable when it is desired to release a record to the turntable for playing, means in response to the upward movement of said holding member for retracting said holding members into said spindle body, means for moving said holding members to their radially extended positions and means for moving said holding member downwardly toward said turntable after the record to be played is positioned on said turntable, whereby one of the record engaging steps on each of said holding members will engage against the top of said record adjacent the centerhole edge thereof and urge the same toward said turntable to provide for conjoint rotation of said record with said turntable.

No references cited.

LEONARD FORMAN, *Primary Examiner.*

J. M. FREED, *Examiner.*